United States Patent

[11] 3,627,210

| [72] | Inventor | Cornelis van der Lely |
| | | 7, Bruscherain, Zug, Switzerland |
| [21] | Appl. No. | 811,383 |
| [22] | Filed | Mar. 28, 1969 |
| [45] | Patented | Dec. 14, 1971 |
| [32] | Priority | Mar. 29, 1968 |
| [33] | | Netherlands |
| [31] | | 68,04406 |

[54] WAGONS
28 Claims, 11 Drawing Figs.

| [52] | U.S. Cl. | 239/657 |
| [51] | Int. Cl. | A01c 19/00 |
| [50] | Field of Search | 239/650, 653, 657, 670, 676, 681, 684, 687; 222/166, 505, 176; 298/23, 23 F, 23 D, 23 R; 280/415.1, 462, 467, 490 |

[56] References Cited
UNITED STATES PATENTS

| 3,372,842 | 3/1968 | van der Lely | 222/176 X |
| 1,843,685 | 2/1932 | Kissinger | 298/23 F |
| 1,906,606 | 5/1933 | Hyman | 280/462 X |
| 2,104,734 | 1/1938 | Carpenter | 280/490 |
| 2,419,262 | 4/1947 | Gurries et al. | 239/657 X |
| 2,442,743 | 6/1948 | Wester | 239/657 |
| 2,994,138 | 8/1961 | Fourlan | 280/467 X |
| 3,010,726 | 11/1961 | Smoker et al. | 239/657 |
| 3,273,898 | 9/1966 | van der Lely | 239/670 |

FOREIGN PATENTS

| 1,416,832 | 9/1965 | France | 239/172 |
| 1,499,350 | 9/1967 | France | 280/490 |
| 1,107,986 | 5/1961 | Germany | 280/415 A |
| 498,604 | 1/1939 | Great Britain | 280/490 |

*Primary Examiner*—Lloyd L. King
*Assistant Examiner*—Edwin D. Grant
*Attorney*—Mason, Mason & Albright ABSTRACT: A wagon has a tiltable, enclosed loading space which pivots adjacent the rear of the supporting frame. A spreader is positioned under an outlet opening in the rear wall of the space. A closing member in the opening is opened as the loading space is tilted to unload more or less material through the opening depending on the angle of tilting. The frame is connected by flanges to a drawbar so that the height of the drawbar can be changed.

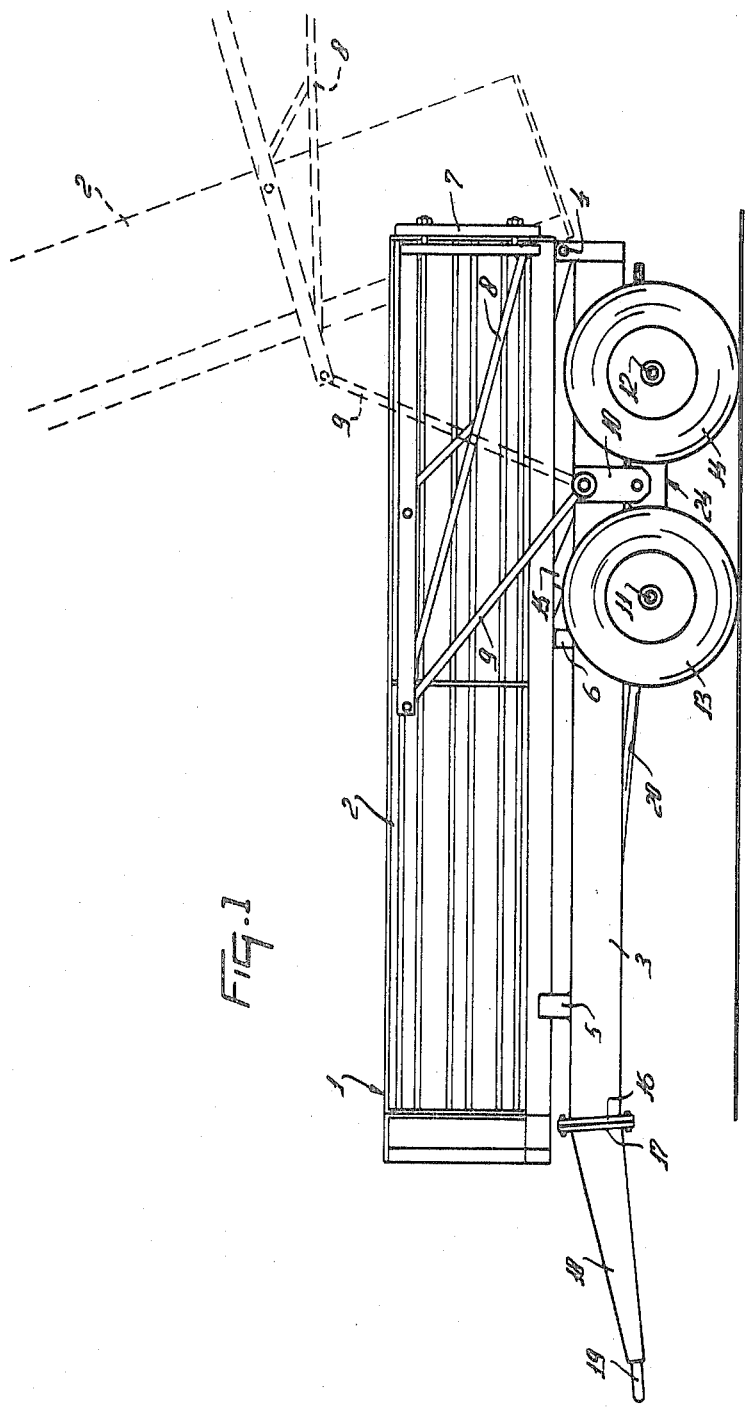

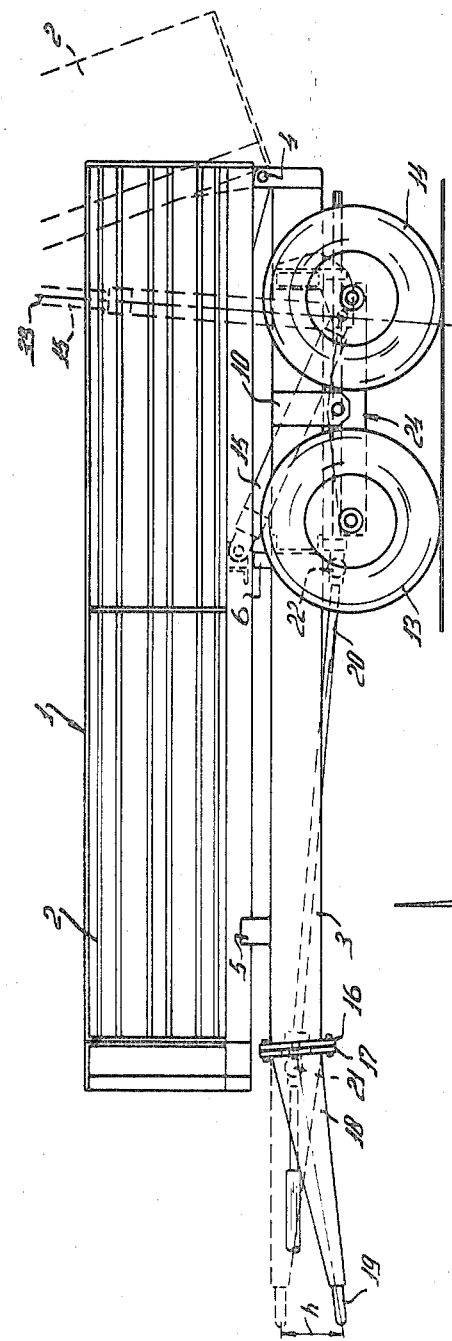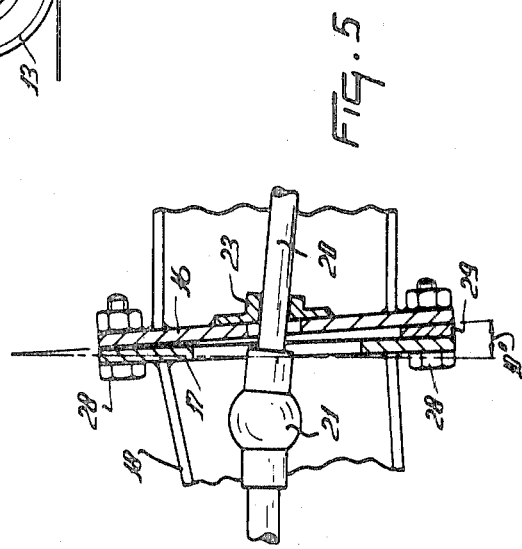

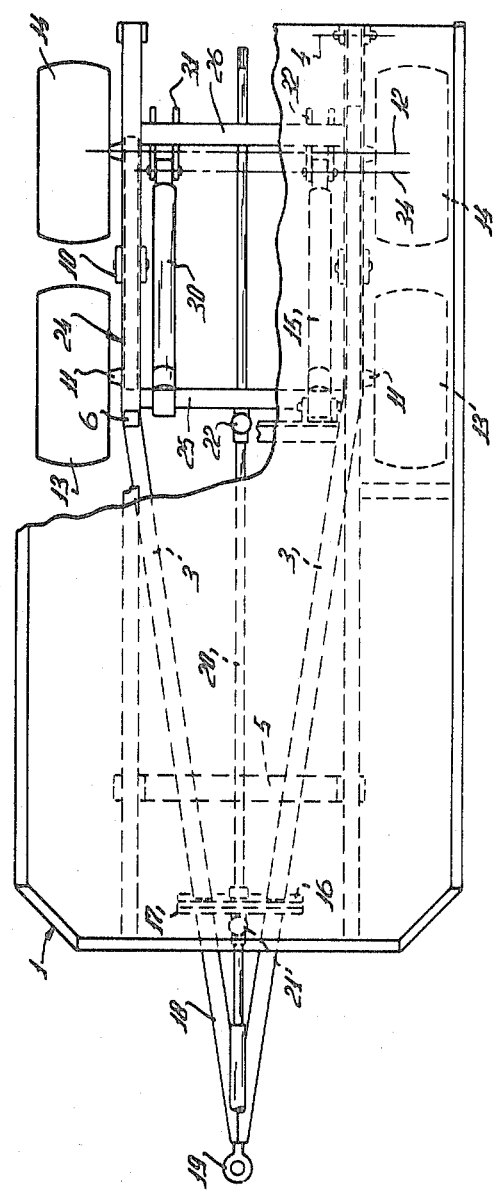
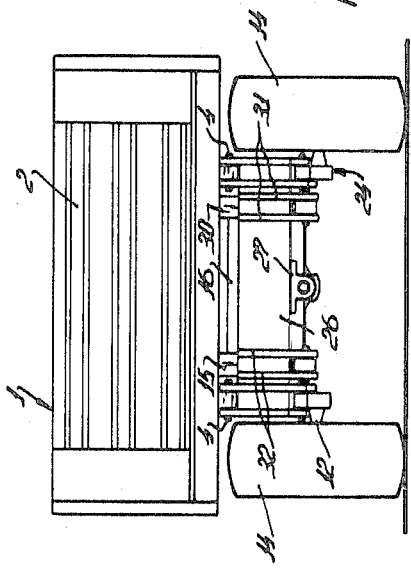

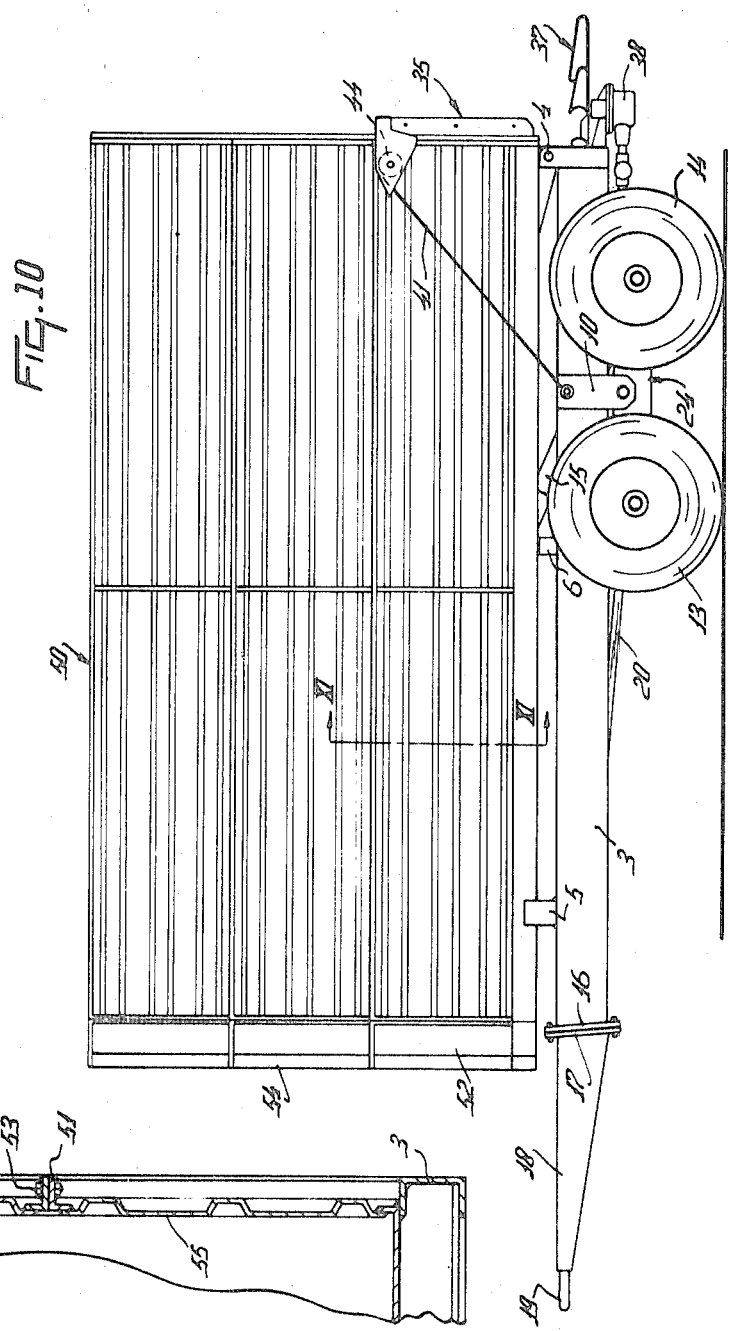

WAGONS

It is an object of the invention to provide a towed wagon with a big loading capacity which is sustained on at least three or more running wheels and which has a spreading device, whereby the material to be strewn will flow to the spreading device without movable transporting means within the loading space.

According to a further object of the invention, there is provided a wagon of the kind set forth, wherein the loading space is provided with a flow control or dosing member with the aid of which material from the space can be spread or discharged at a controlled rate and/or in controlled quantities.

Figure 6:
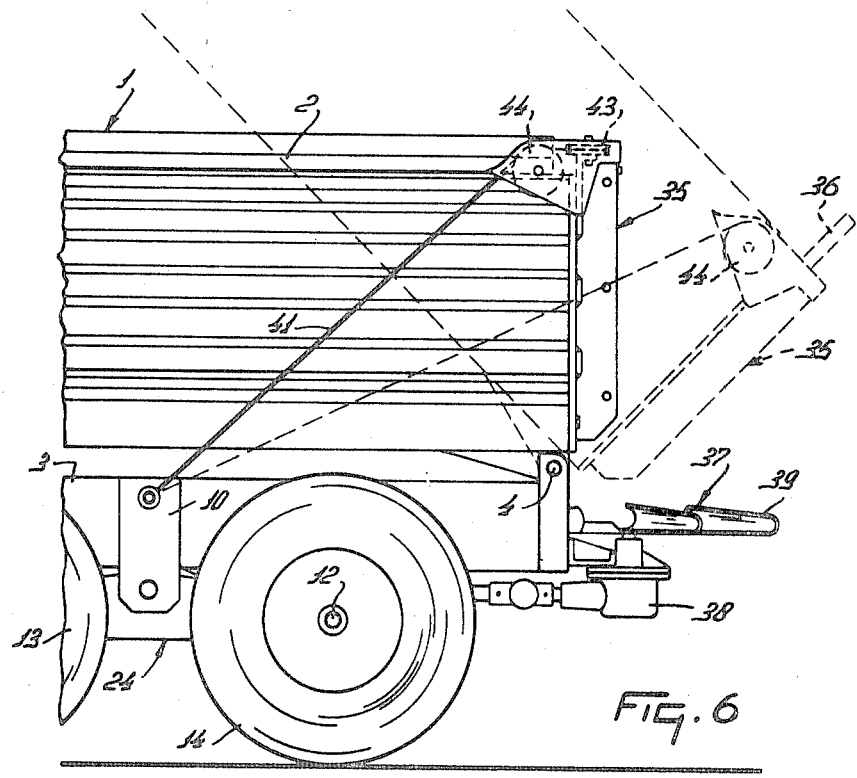
Figure 9:
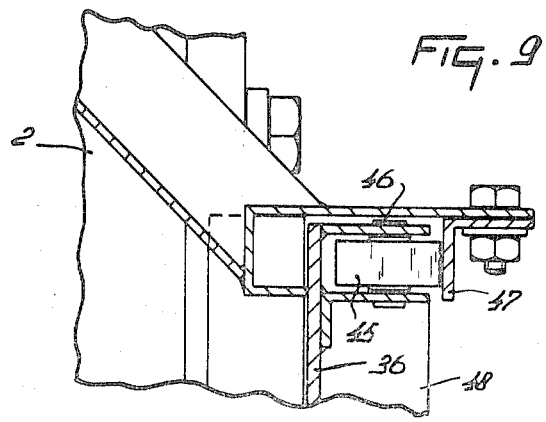
Figure 7:
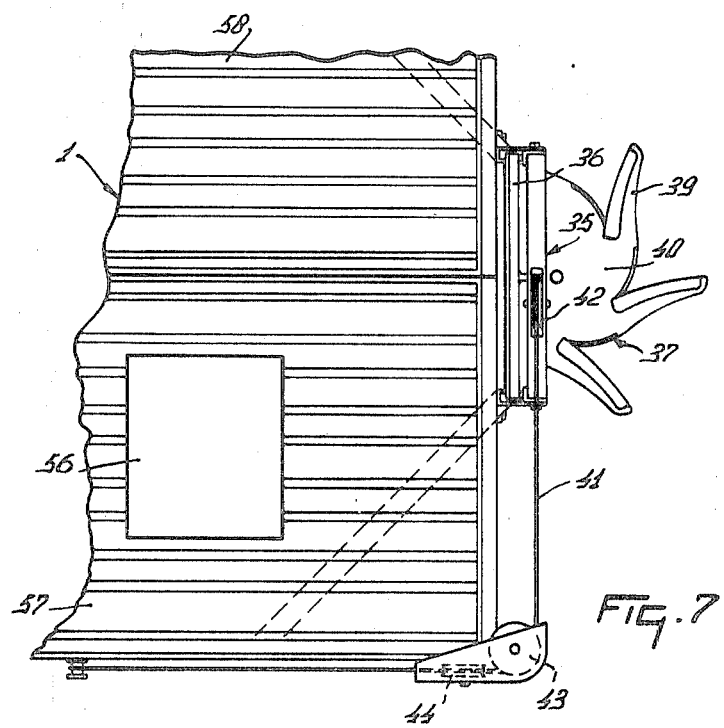
Figure 8:
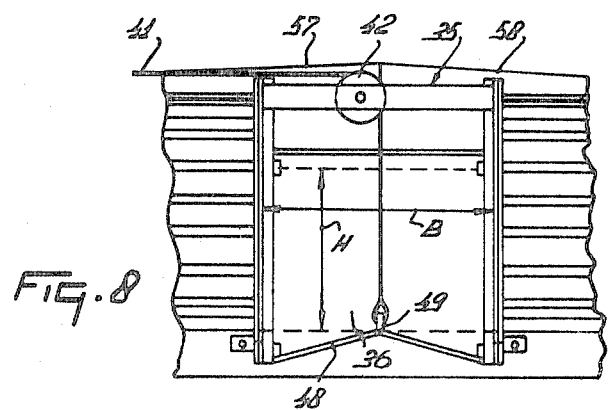

For a better understanding of the invention, and to show how the same way be carried into effect, reference will now be made, by way of example, to the accompanying drawings, in which:

FIGS. 1 and 2 are side elevations of a wagon in accordance with the invention occupying various positions, FIG. 3 is a plan view corresponding to FIGS. 1 and 2, FIG. 4 is a rear elevation corresponding to FIGS. 1,2 and 3, FIG. 5 is a scrap side elevation, to an enlarged scale, showing the connection between a drawbar and the frame of the wagon in greater detail, FIG. 6 is a side elevation, to an enlarged scale, of a rear portion of the wagon showing the arrangement of additional parts, FIG. 7 is a scrap plan view corresponding to FIG. 6, FIG. 8 is a scrap rear elevation showing further details of parts that can be seen in FIGS. 6 and 7, FIG. 9 is a scrap view, to an enlarged scale, showing further details of the construction visible in FIGS. 6, 7 and 8 of the drawings, FIG. 10 is a side elevation of a wagon in accordance with the invention provided with a plurality of superposed loading spaces, and FIG. 11 is a scrap section, to an enlarged scale, taken on the line XI—XI of FIG. 10.

Referring firstly to FIGS. 1 to 5 of the drawings, the wagon 1 which is illustrated has a loading space or trough 2 that is supported from beneath by a frame 3. The space 2 is tiltable upwardly and rearwardly, relative to the intended direction of forward travel of the wagon, about coaxial substantially horizontal shafts 4 that extend substantially perpendicular to the direction just mentioned, said direction being from right to left as seen in FIGS. 1, 2 and 3 of the drawings. When occupying its normal lowered position, the loading space 2 rests upon supports 5 and 6 that are fastened to the frame 3. The rear wall 7 of the loading space 2 takes the form of a flap that can be moved away from the remainder of the space, upon tilting of the latter, with the aid of pivotally interconnected arms 8 and 9. The arms 8 and 9 are pivotable relative to one another and the arms 9 are also pivotable relative to brackets 10 that are fastened to the frame 3. In the embodiment which is being described, the maximum angle through which the loading space 2 can be turned upwardly and rearwardly about the shaft 4 from the normal lowered position shown in full lines in FIGS. 1 and 2 is about 75°. The brackets 10 which have just been mentioned are located between forward ground wheels 13 and rearward ground wheels 14 disposed at opposite sides of the wagon at opposite ends of corresponding forward and rearward axles 11 and 12. A hydraulic piston and cylinder assembly 15 has one end pivotally connected to a beam 26 that is near to the axle 12 and its opposite end pivotally connected to the lower side of the floor of the space 2. The assembly 15 is located towards the left-hand side of the wagon and a similar assembly 30 extends between the beam 26 and the floor of the space 2 towards the relatively opposite side of the wagon. It will be apparent that extension of the piston rods of the two assemblies 15 and 30 will cause the space 2 to tilt upwardly and rearwardly about the shafts 4.

The leading portion of the frame 3 is tapering and terminates in a flange 16. A similar flange 17 forming part of a drawbar 18 is secured to the flange 16 with the aid of bolts 28, the leading end of the drawbar 18 being formed with a coupling eye 19 adapted to cooperate with a towing hook, clevis pin or the like that is mounted on an agricultural tractor or some other towing vehicle (not shown).

A driving shaft 20 is formed in three portions which portions are interconnected by two universal joints 21 and 22, the leading portion being arranged to be driven from the power takeoff shaft of the agricultural tractor or other towing vehicle. To this end, the leading portion of the driving shaft 20 is of telescopic construction and has at its leading end (not shown) a further universal joint. Immediately to the rear of the universal joint 21, the central portion of the driving shaft 20 is rotatably journaled in a bearing sleeve 23 fastened to the rear side of the flange 16 in register with a central opening in that flange. The other flange 17 is, of course, also formed with a central opening which is appreciably larger than the openings in the flange 16. The frame 3 includes a supporting system 24 the forward and rearward transverse horizontal beams 25 and 26 of which are provided with sleeve bearings 27 in which the rear portion of the driving shaft 20 is rotatably mounted. Agricultural implements coupled to the rearmost end of the long wagon can, when required, be driven from the rearmost end of the driving shaft 20.

The flanges 16 and 17 are inclined to the vertical at an angle of between about 5° and 10° and, as previously mentioned, are detachably secured to one another by the bolts 28 which can be seen best in FIG. 5 of the drawings. The holes that are formed in the flanges 16 and 17 for the reception of the bolts 28 are arranged at regular intervals around the peripheries of those flanges and thus different levels of the coupling eye 19 can be attained by turning the flange 17 relative to the flange 16 and employing those bolt holes which are appropriate to the desired level of the coupling eye 19. The eye 19 is, of course, separately adjustable with respect to the drawbar 18 to maintain its horizontal disposition. The maximum different in height $h$ (FIG. 2) between the lowermost level of the coupling eye 19 and the uppermost level thereof is attained by turning the flange 17 through 180° relative to the flange 16 thus bringing it from he full line position shown in FIG. 2 of the drawings to he broken line position shown in the same FIG. Spacers 29 (FIG. 5) of different thicknesses may also be sandwiched between the flanges 16 and 17 to bring the coupling eye 19 to different intermediate levels and it will be appreciated that the coupling eye 19 can be made to cooperate with drawbars or drawhooks at different levels without difficulty. It will be appreciated that the height $h$ is also dependent upon the length of the drawbar 18 and is, in fact, equal to the length of said drawbar 18 multiplied by the sine of the angle enclosed between the general plane of the flange 17 and a vertical plane containing the uppermost edge of that flange. The maximum size of the angle just mentioned is 10° and it is shown in FIG. 5 of the drawings.

The previously mentioned hydraulic piston and cylinder assemblies 15 and 30 are pivotally connected to supports 31 and 32 which are connected to the beam 26 in such a way that the axis 34 (FIG. 3) of the pivotal connections between said assemblies and said supports is disposed between the beams 25 and 26 in a position which is such that, when the loading space 2 is fully raised, a line 33 (FIG. 2) that is coincident with the longitudinal axis of each piston and cylinder assembly crosses the longitudinal axis of the beam 26 at right angles when the wagon is viewed in front elevation. This arrangement enhances the stability of the wagon when the loading space 2 is fully raised. The stability is also improved by using the double-axled supporting system 24 which system is disposed very close to the shafts 4. As can be seen in FIG. 3 of the drawings, the longitudinal axis of the axle 12 is about eight times as far from the longitudinal axis of the shafts 4 as it is from the axis 34 mentioned above.

FIGS. 6 to 9 of the drawings illustrate a construction in which a flow control or dosing member 35 is provided at the rear of the loading space 2, said flow control member 35 being comprised principally by a slide 36 having associated control mechanism. A rotary spreading member 37 is located at the lower delivery end of the slide 36. It can be seen from the drawings that the rotary spreading member 37, which has curved or straight spreading blades 39, is driven from the rear end of the shaft 20 by way of a universal joint and a gear box 38 containing appropriate intermeshing toothed pinions. The quantity of material per unit time which reaches the rotary spreading member 37 from the interior of the loading space 2 is determined principally by the setting of the slide 36, such material falling substantially centrally on to an ejecting disc 40 (FIG. 7) whose edge is surrounded by the blades 39. It will be appreciated that the shapes and inclinations of the blades 39 are a principal factor in determining the spreading pattern of the material from the space 2 and that alternative bladed discs 40 can be used if so desired.

It is preferred to employ a flat slide 36 which is substantially coplanar with the rear wall of the space 2, the slide 36 being arranged to be moved upwardly and downwardly with the aid of a rope, chain or cable 41. The rope, chain or cable 41 is guided around pulleys 42, 43 and 44 of appropriate form and has one end fastened to an eye 49 (FIG. 8) mounted at the lower edge of the slide 36. The opposite end of the rope, chain or cable is secured to one of the brackets 10 (FIG. 6) and the arrangement is such that, when the space 2 is raised by tilting it rearwardly about the shafts 4, the distance between the pulley 44 and the bracket 10 concerned is increased (see FIG. 6). The rope, chain or cable thus moves around the pulleys 42, 43 and 44 raises the slide 36 away from the bottom of the space 2 through a distance such as, for example, the distance H which can be seen in FIG. 8 of the drawings. The maximum value of the distance H is thus dependent upon the maximum angle through which the loading space 2 can be tilted. It is desirable to provide the slide 36 with rollers 45 (FIG. 9) to ensure that said slide can move easily between its open and closed positions. The rollers 45 are rotatably mounted on stub shafts 46 and bear against strips 47 that are fastened in position at the rear of the loading space 2. In order to effect a gradual opening of the hole in the rear wall of the space 2 which is normally closed by the slide 36, the lowermost edge 48 (FIG. 8) of said slide 36 is of shallow inverted V-shaped configuration so that, as the rope, chain or cable 41 pulls the slide 36 upwardly, the opening in the rear wall of the space 2 is freed progressively rather than instantaneously. It is preferred to use an ejecting disc 40 which has a diameter that is not less than the maximum height H or maximum width B (FIG. 8) of the fully freed opening in the rear wall of the space 2 so that circumstances will never arise in which any appreciable portion of the material issuing from the space 2 misses the disc 40.

FIGS. 10 and 11 of the drawings illustrate a construction in which the single loading space 2 is replaced by a nest of spaces 50. To this end, the upper rim 51 of the lowermost space 52 is connected by bolts 53 to a matching bottom rim of the superposed space 54. It is desirable that the walls of the nest of spaces 50 should be made from a thin ribbed or otherwise profiled material 55 so that a rigid construction of small weight is obtained. It will be seen that the nest of spaces 50 do, in fact, form a single loading space whose height can be increased or decreased by adding or removing at least one layer of the nest of spaces 50. Thus, with either of the two described constructions, wind cannot blow material out of the loading space during travel of the wagon, the loading space being provided with cooperating tiltable covers 57 and 58 (FIGS. 7 and 8) in one of which covers an inspection flap 56 is provided so that the contents of the space can be viewed without lifting either of the covers. The flap 56 may, if desired, be formed from a transparent material.

Having thus described my invention what I claim as new and desire to secure by Letters Patent of the United States is:

1. A wagon comprising a frame, a loading space with walls and a rear outlet with flow control means mounted on said frame, a spreading device for receiving material from said outlet and spreading same, said outlet being located in the center part of the rear upstanding wall of the loading space and solely in the part of said wall above said spreading member, said spreading device being rotatable about a substantially vertical axis, means at he forward end of said frame to connect said wagon to a prime mover, said wagon being supported by running wheels on axles connected to said frame, at least two running wheel axles being mounted on behind the other relative to the direction of travel, said loading space being connected to said flow control means and being tiltable about an axis located substantially to the rear of said wheels whereby, during operation, the bottom of said loading space can be tilted to slope downwardly towards said outlet to automatically move aid flow control means and increase the size of said outlet so that material from said outlet flows to substantially the same portion of said spreading device.

2. A wagon as claimed in claim 1, wherein the loading space has a downward sloping bottom which is flat and located over and above said wheels.

3. A wagon as claimed in claim 1, wherein said spreading device rotates about an axis which is located in the vertical plane which extends through the longitudinal centerline of said loading space.

4. A wagon comprising a frame and a loading space on said frame, a spreader member supported on said frame, flow control means for delivering material from said loading space to said spreader member and said means having a single outlet with a generally vertical opening in the rear upstanding wall of said loading space, said flow control means being positioned to vary the open cross-sectional area of said opening so as to regulate the flow of material therethrough, said loading space being movable and tiltable relative to said frame and said spreading member, and said control means being arranged to automatically open said flow control means as said loading space is tilted so that the flow of material to said spreader member through the whole open cross-sectional area of said opening is an automatic result of the tilting of said loading space, said spreader member being mounted for movement about a vertical axis and connected to a drive shaft which extends beneath said loading space from the front of said wagon to said spreader member, towing means including hollow flange means for said wagon connected to said frame to extend forwardly, adjacent said drive shaft.

5. A wagon as claimed in claim 4, wherein said spreader member has a central ejecting disc with a diameter at least equal to the maximum height and the maximum width of said opening.

6. A wagon as claimed in claim 4, wherein said drive shaft includes a plurality of separate portions which are drivingly interconnected by universal joints.

6. A wagon as claimed in claim 6, wherein said drive shaft is rotatably mounted in a flange connection supported at the front of said wagon and in a supporting system at the rear of said wagon.

8. A wagon as claimed in claim 4, wherein a drawbar is connected to said frame through a flange inclined to the vertical.

9. A wagon as claimed in claim 8, wherein said flange means is inclined to the vertical at an angle of between 5° and 10°.

10. A wagon as claimed in claim 8, wherein said flange means includes a flange on said frame and a further flange on said drawbar, spacers sandwiched between said flanges that alter the level of the leading end of said drawbar above the ground.

11. A wagon as claimed in claim 4, wherein said drive shaft passes through said flange means.

12. A wagon as claimed in claim 11, wherein said frame includes two main beams that extend substantially parallel to one another in spaced relationship in the intended direction of travel of said wagon, the leading ends of said beams converging to a junction which is provided with a flange of said flange means, said flange means including a further flange associated with said drawbar, said flanges being located approximately centrally of the width of said loading space.

13. A wagon as claimed in claim 12, wherein said two main beams are interconnected by a pair of relatively spaced transverse beams.

14. A wagon as claimed in claim 12, wherein said frame includes a double-axled supporting system and two piston and cylinder assemblies that extend between said loading space and said supporting system for tilting said loading space with respect to said frame.

15. A wagon having a frame and an enclosed loading space mounted on said frame, said loading space being tiltable about pivot means at the rear of said frame, a spreader member being mounted at the rear of said wagon adjacent an outlet in said loading space, said outlet including an opening and a flow control member comprising a part which is moved as a result of the tilting of said loading space to vary the open cross-sectional area of said opening, said part being a slide with its lowermost edge being of inverted V-shaped configuration which is located beneath said opening when said slide is in a fully closed position.

16. A wagon as claimed in claim 15 wherein said loading space has a bottom which encloses an angle of more than 25° when said loading space is tilted.

17. A wagon as claimed in claim 15, wherein an eye is mounted at the point of the V-shaped edge and flexible member is connected to said eye to control said slide.

18. A wagon as claimed in claim 17, wherein said flexible member is passed through three relatively spaced pulleys on said wagon, two of said pulleys having axes of rotation in fixed positions with respect to said loading space.

19. A wagon as claimed in claim 18, wherein the axes of rotation of said two pulleys are mutually inclined at angles of about 90°.

20. A wagon having a frame and an enclosed loading spaced mounted on said frame, said loading space being tiltable about pivot means at the rear of said frame, a spreader member being mounted at the rear of said wagon adjacent an outlet in said loading space, said outlet including an opening and a flow control member comprising a part which is moved as a result of the tilting of said loading space to vary the open cross-sectional area of said opening, said opening being located in the central portion only of the rear wall and said spreader member being located beneath said opening and being rotatable about a substantially vertical axis located in a vertical plane extending through the center of said loading space, drive means extending from the front of said loading space to said spreader member along said vertical plane.

21. A wagon as claimed in claim 20, wherein said spreader member is supported on said frame below said loading space whereby said spreader member remains fixed when said loading space is tilted to unload.

22. A wagon as claimed in claim 20, wherein said flow control part includes a slide which cooperates with said opening in said loading space whereby the angular position of said loading space about its tilting axis varies the open cross-sectional area of said opening.

23. A wagon as claimed in claim 22, wherein said opening is closed by said slide when said loading space is fully lowered to a substantially horizontal position, said slide being in extreme open position when the longitudinal axis of said loading space is inclined to the horizontal at an angle of about 75°.

24. A wagon as claimed in claim 22, wherein a flexible member is connected to said slide, said flexible member being passed around pulleys and connected to a fixed position relative to said frame.

25. A wagon as claimed in claim 22, wherein said slide is mounted on the rear wall of said loading space with means to facilitate the movement of said slide relative to said rear wall.

26. A wagon as claimed in claim 25, wherein said facilitating means includes rollers mounted on said slide.

27. A wagon as claimed in claim 26, wherein said rollers are rotatable about stub shafts on said slide, said rollers cooperating with slideways that are fixed to said rear wall.

28. A wagon having a frame and an enclosed loading space mounted on said frame, said loading space being tiltable about pivot means, said pivot means being situated at the rear of said frame with respect to the intended direction of travel of the wagon, a spreading device member being mounted at the rear side of said wagon, flow control means for delivering material from said loading space to said spreader and said means having a single outlet with a generally vertical opening in the rear upstanding wall of said loading space, said outlet located in front of a vertical plane positioned perpendicular to the intended direction of travel and which passes through the axis of rotation of said spreading device, said spreading device being mounted for movement about a substantially vertical axis, said opening being located in the central portion of said rear wall and behind the pivot axis of said loading space, a flow control member positioned adjacent said outlet and above said spreading device to vary the open cross-sectional area of said opening automatically during the tilting of said loading space, drive means extending from the front of said wagon to said spreader member along the central portion of said wagon, towing means for said wagon connected to said frame to extend forwardly for connecting said wagon to a prime mover.

* * * * *